(12) United States Patent
Moon et al.

(10) Patent No.: US 9,332,583 B2
(45) Date of Patent: May 3, 2016

(54) MULTIPOINT COMMUNICATION DEVICE AND METHOD OF PERFORMING SWITCHING FROM MULTIPOINT COMMUNICATION TO POINT-TO-POINT COMMUNICATION

(71) Applicant: SAMSUNG SDS CO., LTD., Seoul (KR)

(72) Inventors: Yun Kyoung Moon, Seoul (KR); Hee Tae Yoon, Seoul (KR); Seong Hun Shin, Seoul (KR); Shin Lee, Seoul (KR); Young Kwang Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 181 days.

(21) Appl. No.: 14/141,638

(22) Filed: Dec. 27, 2013

(65) Prior Publication Data

US 2014/0323110 A1 Oct. 30, 2014

(30) Foreign Application Priority Data

Apr. 25, 2013 (KR) .................. 10-2013-0046382

(51) Int. Cl.
*H04M 3/00* (2006.01)
*H04W 76/04* (2009.01)
*H04W 76/00* (2009.01)

(52) U.S. Cl.
CPC .......... *H04W 76/043* (2013.01); *H04W 76/002* (2013.01)

(58) Field of Classification Search
CPC ............................ H04W 76/023; H04W 76/02
USPC ........ 455/418–422.1, 456.3–457, 435.1–436; 713/151–153; 709/245, 224, 226–230, 709/238, 219; 726/23, 3, 25
See application file for complete search history.

(56) References Cited

U.S. PATENT DOCUMENTS

| 2003/0217177 A1* | 11/2003 | Gulati | H04L 49/252 709/238 |
| 2010/0094953 A1* | 4/2010 | Kwon | H04L 67/325 709/219 |

* cited by examiner

Primary Examiner — Babar Sarwar
(74) Attorney, Agent, or Firm — Sughrue Mion, PLLC

(57) ABSTRACT

There is provided a method of switching from multipoint communication to point-to-point communication while a device performs the multipoint communication with a plurality of participant devices. The method comprises: sharing, by the device, peer-to-peer (P2P) connection information of the device and P2P connection information of each of the plurality of participant devices, with the plurality of participant devices; and switching by the device, from the multipoint communication to the point-to-point communication using the P2P connection information of remaining participant devices of the plurality of participant devices in the multipoint communication when a total number of the remaining participant devices of the multipoint communication decreases to two.

20 Claims, 3 Drawing Sheets

MULTIPOINT COMMUNICATION DEVICE AND METHOD OF PERFORMING SWITCHING FROM MULTIPOINT COMMUNICATION TO POINT-TO-POINT COMMUNICATION

CROSS-REFERENCE TO RELATED APPLICATION

This application claims priority to and the benefit of Republic of Korea Patent Application No. 10-2013-0046382 filed on Apr. 25, 2013, the disclosure of which is incorporated herein by reference in its entirety.

BACKGROUND

1. Field

The present disclosure relates to multipoint communication technology through a network.

2. Discussion of Related Art

With an international spread of devices such as smartphones and tablets using a wireless network, a multimedia over Internet protocol (MoIP) service using a mobile communication network (e.g., a third generation (3G) network or a long-term evolution (LTE) network) and/or a wireless Internet network (a WiFi network) is also spreading.

A scheme of providing the MoIP service over a network is roughly classified into a peer-to-peer (P2P) scheme and a server relay scheme. The P2P scheme provides the MoIP service through a direct inter-device connection and is mainly used in point-to-point voice/video communications. The server relay scheme is one in which each device is connected to a separate server such as a multipoint conference unit (MCU) and the connected server mixes and provides voices and videos of participants and is mainly used for multipoint communication among three or more participants.

In the above-mentioned MoIP service, a scheme and a protocol for providing the service for point-to-point communications are different from those for providing the service for multipoint communications. Accordingly, when a device that performs a multipoint communication attempts, upon some participants' ending of the communication, to switch from the multipoint communication to a point-to-point communication, a disconnection may occur in a process of ending the multipoint communication and generating a separate point-to-point communication call. Thus, there is a need for a switching method of reducing disconnections when the multipoint communication is switched to the point-to-point communication.

SUMMARY

Exemplary embodiments of the present disclosure are directed to providing efficient means for performing switching from multipoint communication to point-to-point communication between devices.

According to an embodiment of the present disclosure, there is provided a method of switching from multipoint communication to point-to-point communication while a device performs the multipoint communication with a plurality of participant devices, the method comprising: sharing, by the device, peer-to-peer (P2P) connection information of the device and P2P connection information of each of the plurality of participant devices, with the plurality of participant devices; and switching by the device, from the multipoint communication to the point-to-point communication using the P2P connection information of remaining participant devices of the plurality of participant devices of the plurality of participant devices in the multipoint communication when a total number of the remaining participant devices of the multipoint communication decreases to two.

According to another embodiment of the present disclosure, there is provided a non-transitory computer-readable recording medium having embodied thereon a program which, when executed, causes a device to implement a method, the method comprising: sharing, by the device, P2P connection information of the device and P2P connection information of each of a plurality of participant devices with the plurality of participant devices in order to switch from multipoint communication to point-to-point communication while the device performs the multipoint communication with the plurality of participant devices; and switching by the device, from the multipoint communication to the point-to-point communication using the P2P connection information of remaining participant devices of the plurality of participant devices in the multipoint communication when a total number remaining participant devices of the multipoint communication decreases to two.

According to the exemplary embodiments of the present disclosure, it is possible to rapidly perform switching from multipoint communication to point-to-point communication by sharing P2P connection information of respective participants in advance while the multipoint communication is performed, and, furthermore, minimize a sense of interruption a user may experience.

BRIEF DESCRIPTION OF THE DRAWINGS

The above and other objects, features and advantages of the present disclosure will become more apparent to those familiar with this field from the following detailed description when taken in conjunction with the accompanying drawings, in which.

DETAILED DESCRIPTION OF EXEMPLARY EMBODIMENTS

Exemplary embodiments of the present disclosure will be described in detail below with reference to the accompanying drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
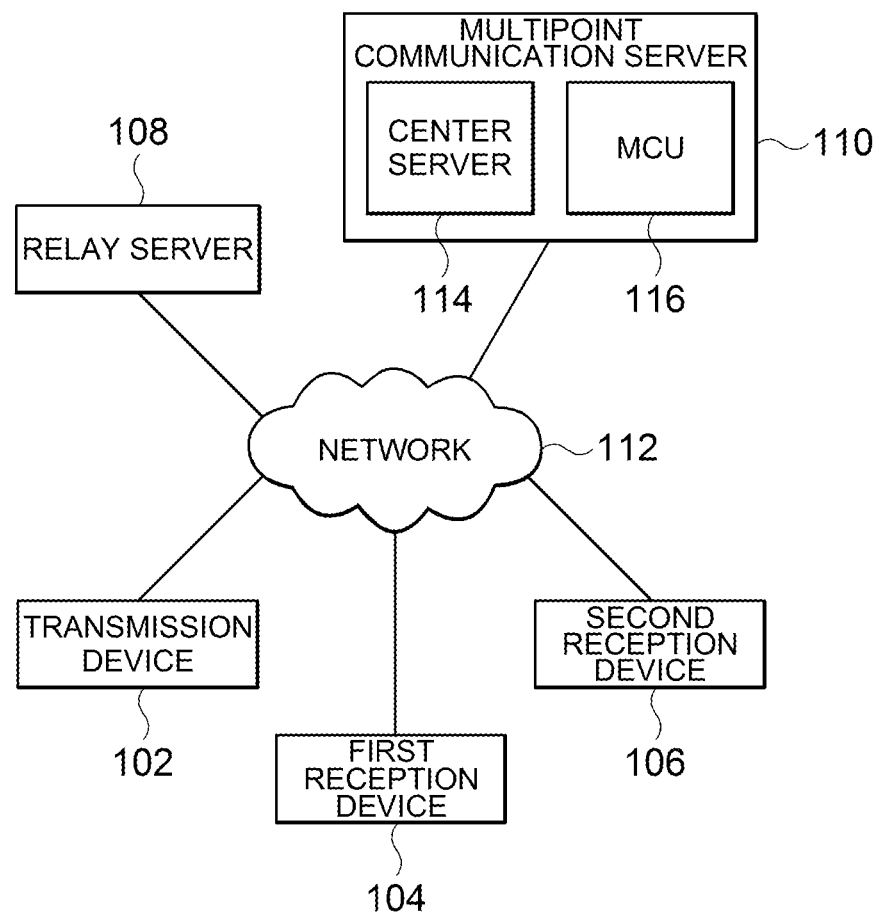
FIG. 1 is a block diagram illustrating a multipoint communication system 100 according to an exemplary embodiment of the present disclosure.

FIG. 1 is a block diagram illustrating a multipoint communication system 100 according to an exemplary embodiment of the present disclosure. As illustrated, the multipoint communication system 100 according to the exemplary embodiment of the present disclosure includes a transmission device 102, a first reception device 104, a second reception device 106, a relay server 108, and a multipoint communication server 110. The illustrated exemplary embodiment is only for describing an example in which devices participating the multipoint communication are three devices of the transmission device 102, the first reception device 104, and the second reception device 106. It should be noted that the number of reception devices may differ according to the number of devices participating in the multipoint communication.

The above-described components are configured to transmit and receive a message or data to and from each other through a network 112. In the exemplary embodiment of the present disclosure, the network 112 serves as a medium for relaying message or data transmission and reception of each component of the multipoint communication system 100, and, for example, may include all types of communication networks in which packet communication is possible such as a mobile communication network such as a 3G network or an LTE network and wireless and wired Internet networks.

As devices to be used by users of a multipoint conference service provided from the multipoint communication system 100, the transmission device 102, the first reception device 104, and the second reception device 106, for example, may include personal portable devices such as a smartphone and a tablet or devices such as a notebook computer and a desktop computer. In the exemplary embodiment of the present disclosure, as devices by which both point-to-point communication through P2P communication and multipoint communication through the multipoint communication server 110 to be described later may be performed, the transmission device 102, the first reception device 104, and the second reception device 106 include software and hardware resources for the above-described point-to-point communication or multipoint communication.

In the exemplary embodiment, the transmission device 102, the first reception device 104, and the second reception device 106 perform the multipoint communication by connecting to a virtual conference room opened in the multipoint communication server 110 to be described later. At this time, the transmission device 102 represents a device that opens the conference room for the first time and the first reception device 104 and the second reception device 106 are devices which receive a request for participating in the virtual conference room opened by the transmission device 102 and participate in the multipoint communication. Although the two reception devices are illustrated in the drawings as described above, this is only an example. In the exemplary embodiment of the present disclosure, the number of devices which participate in the multipoint communication is not limited. Also, in this exemplary embodiment and the following exemplary embodiments, it should be noted that "communication" includes all types of inter-user communications capable of being performed using devices such as general voice communication, video communication, and a text/multimedia chat. Also, in the exemplary embodiment of the present disclosure, the transmission device 102, the first reception device 104, and the second reception device 106 are the same type of devices which are merely classified according to functions to be performed. As necessary, entities which perform functions constituting the present disclosure may be configured in various forms.

While the multipoint communication is performed among a plurality of devices as described above, the number of participants of the multipoint communication may be changed in some cases. For example, this change may occur when some of the devices which are participating in the multipoint communication end communication or connections of some users are disconnected due to an error in a network. When the number of devices participating in the multipoint communication is two due to the communication end or the like of some of the devices which are participating in the multipoint communication (that is, when it is not necessary to maintain the multipoint communication any more), the devices remaining in the multipoint communication are switched from the multipoint communication to the point-to-point communication. For example, when the second reception device 106 which is participating in the multipoint communication ends communication, the transmission device 102 and the first reception device 104 may be switched from the multipoint communication to the point-to-point communication by ending the connection to the virtual conference room opened in the multipoint communication server 110 and generating a direct P2P connection between the transmission device 102 and the first reception device 104.

When the number of devices which are participating in the multipoint communication is decreased, the switching from the multipoint communication to the point-to-point communication is performed on the following reasons. In the multipoint communication, the communication is performed in a scheme in which the respective devices are connected to the virtual conference room opened in the multipoint communication server 110, voices and videos transmitted from the respective devices to the multipoint communication server 110 are mixed, and the mixed voices and videos are provided to the respective devices. Accordingly, the consumption of network and server resources of the multipoint communication is greater than that of the point-to-point communication through a P2P connection between devices. Thus, the degradation of communication quality or a communication delay is likely to occur in the multipoint communication compared to the point-to-point communication. Accordingly, it is possible to save server and network resources while improving communication quality by performing the switching to the point-to-point communication immediately, when it is determined that switching to the point-to-point communication is possible during the multipoint communication in the exemplary embodiment of the present disclosure.

The relay server 108 is a server in which the transmission device 102, the first reception device 104, and the second reception device 106 register their device information. Although an example in which one relay server 108 is on a network has been described in the illustrated exemplary embodiment, the transmission device 102, the first reception device 104, and the second reception device 106 according to exemplary embodiment may be configured to register device information in different relay servers. In the exemplary embodiment of the present disclosure, the relay server 108 is used to relay message transmission and reception between devices when a direct connection between devices is difficult due to a firewall or the like during a P2P connection between the devices. For example, assuming that the P2P connection is configured between the transmission device 102 and the first reception device 104, the transmission device 102 can first attempt to directly transmit a message to the first reception device 104. If the above-described direct message transmission fails, the transmission device 102 may transmit the message via a relay server connected to the first reception device 104.

The multipoint communication server 110 is a server which provides a multipoint communication service according to a request of a device such as the transmission device 102, the first reception device 104, or the second reception device 106. As illustrated, the multipoint communication server 110 includes a center server 114 and a multipoint control unit (MCU) 116.

The center server 114 opens a virtual conference room for the multipoint communication in the MCU 116 according to the request of the device and provides information for connecting to the opened virtual conference room to each device. At this time, the information may include identification information of the opened virtual conference room and connection information of the MCU 116 in which the virtual conference room is opened. Also, when P2P connection information of each device from the device which is participating in the multipoint communication is registered, the center server 114 shares the registered information with other devices which are participating in the multipoint communication. Also, the center server 114 stores and manages information of the respective devices which participate in the multipoint communication and manages the overall multipoint communication such as the transmission of a message (for example, a push message) for notifying each device of a communication end when some of the devices participating in the multipoint communication end the multipoint communication.

The MCU 116 opens the virtual conference room for the multipoint communication service according to control of the center server 114. Also, the MCU 116 receives and mixes voices or videos from the devices connected to the opened virtual conference room, and provides the mixed voices or videos to the devices.

Figure 2:
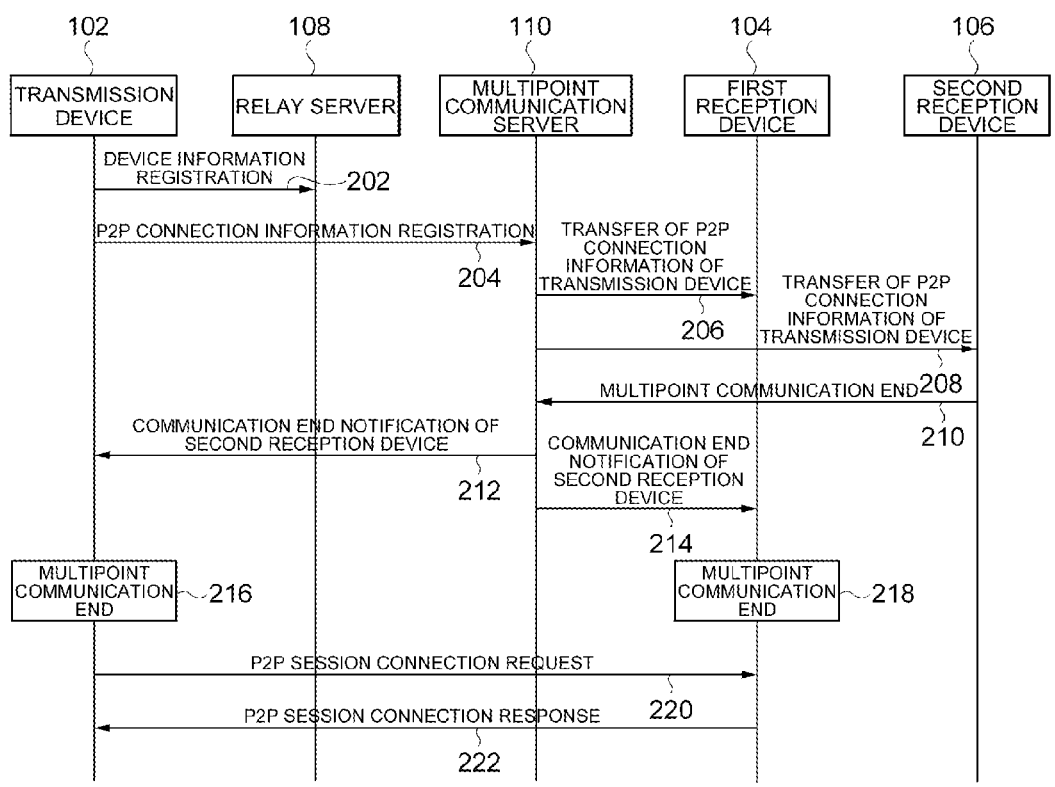
FIG. 2 is a sequence diagram illustrating a method 200 of performing switching from multipoint communication to point-to-point communication according to an exemplary embodiment of the present disclosure.

FIG. 2 is a sequence diagram illustrating a method 200 of performing switching from multipoint communication to point-to-point communication according to an exemplary embodiment of the present disclosure. It is assumed that the transmission device 102, the first reception device 104, and the second reception device 106 perform the multipoint communication by connecting to the opened conference room before this process is performed.

First, the transmission device 102, the first reception device 104, and the second reception device 106 share their own P2P connection information with other devices which are participating in the multipoint communication while the multipoint communication is performed. For example, the transmission device 102 shares its own P2P connection information with the first reception device 104 and the second reception device 106. Likewise, the first reception device 104 and the second reception device 106 share their own P2P connection information with the transmission device 102. At this time, the P2P connection information represents information necessary to establish the P2P connection for point-to-point communication between the devices when switching from the multipoint communication to the point-to-point communication is performed. The above-described sharing process will be described in further detail as follows.

First, the transmission device 102 registers device information of the transmission device 102 in the relay server 108 while the multipoint communication is performed (202). Specifically, the transmission device 102 performs a Simple Traversal of User Datagram Protocol (UDP) through Network Address Translators (NATs) (STUN) test in a STUN server (not illustrated), receives NAT type information of the transmission device 102 from the STUN server, and transmits a registration request message including its own received NAT type information and its own private network address (private IP/port) to the relay server 108, thereby registering the device information in the relay server 108. In addition, in this process, the transmission device 102 may acquire its own public network address (public IP/port) from the relay server 108.

When the device information registration is completed in the relay server 108, the transmission device 102 then registers its own P2P connection information in the multipoint communication server 110 (204). At this time, the P2P connection information of the transmission device 102 may include NAT type information, a public network address, a private network address, and an address of the relay server in which the transmission device 102 is registered. Then, the multipoint communication server 110 transfers the registered P2P connection information of the transmission device 102 to the first reception device 104 and the second reception device 106 which are participating in the multipoint communication (206 and 208).

Although only a process of registering the transmission device 102 and registering P2P connection information in the relay server 108 has been described with reference to the drawings, the first reception device 104 and the second reception device 106 also register their own P2P connection information in the multipoint communication server 110 through the same process as described above. That is, respective devices which participate in the multipoint communication through the above-described process register their own P2P connection information while receiving P2P connection information of other devices from the multipoint communication server 110.

In this manner, when the total number of participants of the multipoint communication is decreased to two due to a communication end of some devices after the P2P connection information of the respective devices is shared, the devices remaining in the multipoint communication perform switching from the multipoint communication to the point-to-point communication using the shared P2P connection information. This will be described more specifically. In the following exemplary embodiment, it is assumed that the second reception device 106 ends the multipoint communication for convenience of description.

As described above, when the second reception device 106 ends the multipoint communication (210), the multipoint communication server 110 notifies the respective devices of the communication end of the second reception device 106 (212 and 214). In this case, the number of devices remaining in the multipoint communication due to the communication end of the second reception device 106 is decreased to two of the transmission device 102 and the first reception device 104 and thus it is not necessary to maintain the multipoint communication any more. Accordingly, each of the transmission device 102 and the first reception device 104 sensing the communication end of the second reception device 106 ends the multipoint communication (216 and 218) and the point-to-point communication is started by connecting a P2P session between the transmission device 102 and the first reception device 104 using the previously acquired P2P connection information of a communication partner device (220 and 222).

On the other hand, when the first reception device 104 does not receive the communication end notification, or receives the communication end notification late, due to a network error or the like in the above-described step 214, it is difficult for the first reception device 104 to end the multipoint communication because the first reception device 104 does not know the communication end of the second reception device 106. Accordingly, in this case, a configuration may be made so that the multipoint communication is ended at a point in time at which a P2P session connection request (step 220) has been received from the transmission device 102, and a P2P connection with a participant device (corresponding to the transmission device 102 in the exemplary embodiment) transmitting the P2P connection request is established.

On the other hand, any one of connection target devices should transmit a P2P session connection request to a communication partner device in order to connect the P2P session in the above-described steps 220 and 222. At this time, a device which transmits the above-described session connection request differs according to preset connection priority. That is, the transmission device 102 and the first reception device 104 calculate their own connection priorities and connection priorities of communication partners. The device having higher connection priority based on the calculation transmits the P2P connection request to the communication partner device.

In the exemplary embodiments of the present disclosure, a scheme of determining the connection priority is not especially limited, and any method of determining the order between devices is available. For example, the priority may be calculated in consideration of at least one of information representing whether a corresponding device is a transmitter of the multipoint communication, a reception time of the multipoint communication of the corresponding device, and identification information of the corresponding device. For example, the transmitter of the multipoint communication has highest priority. When the transmitter has ended the multipoint communication, the connection priority may be determined in order of participation time in the multipoint communication. When participation times in the multipoint communication are the same, the connection priority may be determined by arranging device identification information in ascending order or descending order. In the above-described exemplary embodiment, a configuration is made so that the transmission device 102 transmits a request message for a P2P session connection because the transmission device 102 which is a transmitter of the multipoint communication has higher priority than the first reception device 104 which is a receiver.

According to the exemplary embodiments of the present disclosure as described above, it is possible to rapidly perform switching from multipoint communication to point-to-point communication by sharing P2P connection information of respective participants in advance while the multipoint communication is performed, and, furthermore, minimize a sense of interruption a user may experience.

Figure 3:
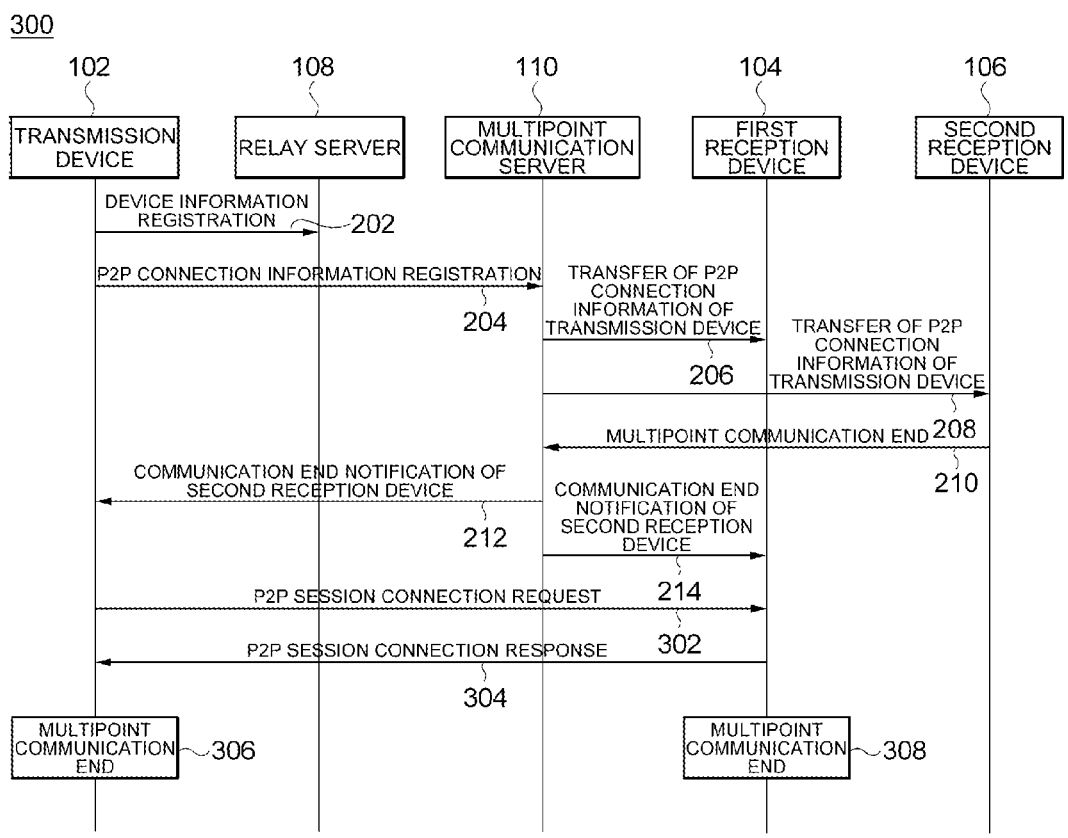
FIG. 3 is a sequence diagram illustrating a method 300 of performing switching from multipoint communication to point-to-point communication according to another exemplary embodiment of the present disclosure.

FIG. 3 is a sequence diagram illustrating a method 300 of performing switching from multipoint communication to point-to-point communication according to another exemplary embodiment of the present disclosure. Except for a process of ending multipoint communication and configuring a P2P session connection, steps in this exemplary embodiment are the same as those in FIG. 2. Accordingly, redundant description of the steps denoted by the same reference numerals as in FIG. 2 is omitted.

This exemplary embodiment is different from the exemplary embodiment illustrated in FIG. 2 in that, when switching from the multipoint communication to the point-to-point communication is performed, a P2P session is first set up between devices (302 and 304) and the multipoint communication is ended after the session has been established (306 and 308). Because inter-device communication through an existing multipoint communication session in operation is possible even when the P2P session setup fails between the remaining devices according to the configuration as described above, this exemplary embodiment has an advantage in terms of stability compared to the exemplary embodiment of FIG. 2. However, in this case, because an unnecessary network load or the like may occur in a process of setting up the P2P session while the multipoint communication session is maintained, a manager may select an appropriate switching method in consideration of processing performance of a device, a network state, etc.

On the other hand, according to an exemplary embodiment of the present disclosure, there is provided a multipoint communication device including a memory for storing a program code and one or more processors for executing the program code, wherein the executing of the program code includes: sharing, by the device, P2P connection information of the device and P2P connection information of each of a plurality of other participant devices with the plurality of other participant devices in order to switch from multipoint communication to point-to-point communication while the device performs the multipoint communication with the plurality of other participant devices; and performing, by the device, switching from the multipoint communication to the point-to-point communication using the P2P connection information of the other participant device remaining in the multipoint communication when the total number of participants of the multipoint communication is decreased to two.

At this time, the sharing may include: registering, by the device, the P2P connection information of the device in a multipoint communication server; and receiving, by the device, the P2P connection information of the plurality of other participant devices from the multipoint communication server.

In addition, the P2P connection information of the device may include NAT type information of the device, a public network address of the device, a private network address, and an address of a relay server in which the device is registered.

The performing of the switching from the multipoint communication to the point-to-point communication may include: receiving multipoint communication end notifications of some other participant devices among the plurality of other participant devices from the multipoint communication server; ending the multipoint communication when the total number of participants of the multipoint communication is decreased to two due to the multipoint communication end of the some other participant devices; and establishing the P2P connection with the remaining other participant device using the P2P connection information of the other participant device remaining in the multipoint communication.

The establishing of the P2P connection may include: calculating connection priorities of the device and the remaining other participant device; and transmitting a P2P connection request to the remaining other participant device when the calculated connection priority of the device is higher than that of the remaining other participant device. The connection priority may be calculated in consideration of at least one of information representing whether a corresponding device is a transmitter of the multipoint communication, a reception time of the multipoint communication of the corresponding device, and identification information of the corresponding device.

Also, the performing of the switching from the multipoint communication to the point-to-point communication may include: receiving multipoint communication end notifications of some other participant devices among the plurality of other participant devices from the multipoint communication server; establishing the P2P connection with the remaining other participant device using the P2P connection information of the other participant device remaining in the multipoint communication when the total number of participants of the multipoint communication is decreased to two due to the multipoint communication end of the some other participant devices; and ending the multipoint communication.

The establishing of the P2P connection may include: calculating connection priorities of the device and the remaining other participant device; and transmitting a P2P connection request to the remaining other participant device when the calculated connection priority of the device is higher than that of the remaining other participant device. The connection priority may be calculated in consideration of at least one of information representing whether a corresponding device is a transmitter of the multipoint communication, a reception time of the multipoint communication of the corresponding device, and identification information of the corresponding device.

The performing of the switching from the multipoint communication to the point-to-point communication may include: receiving a P2P connection request from any one of the plurality of other participant devices; and ending the multipoint communication according to the P2P connection request to establish a P2P connection with the participant device transmitting the P2P connection request.

Those familiar with this field would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those familiar with this field may implement the described functionality in varying ways for each particular application, but such implementation decisions should not be interpreted as causing a departure from the scope of the present disclosure.

The various illustrative logical blocks, modules, and circuits described in connection with the exemplary embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside within a user terminal. Alternatively, a processor and a storage medium may reside as individual components in the user terminal.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A method of switching from multipoint communication to point-to-point communication while a device performs the multipoint communication with a plurality of participant devices, the method comprising:
    performing, by the device, the multipoint communication by connecting with a multipoint communication server and sending a request to the plurality of participant devices, the request instructing the plurality of participant devices to connect with the multipoint communication server;
    sharing, by the device, peer-to-peer (P2P) connection information of the device and P2P connection information of each of the plurality of participant devices, with the plurality of participant devices; and
    switching by the device, from the multipoint communication to the point-to-point communication using the P2P connection information of remaining participant devices of the plurality of participant devices in the multipoint communication when a total number of the remaining participant devices of the multipoint communication decreases to two.

2. The method of claim 1, wherein the sharing comprises:
    registering, by the device, the P2P connection information of the device in the multipoint communication server; and
    receiving, by the device, the P2P connection information of the plurality of participant devices from the multipoint communication server.

3. The method of claim 2, wherein the P2P connection information of the device comprises network address translator (NAT) type information of the device, a public network address of the device, a private network address of the device, and an address of a relay server in which the device is registered.

4. The method of claim 2, wherein the switching from the multipoint communication to the point-to-point communication comprises:
    receiving, from the multipoint communication server, multipoint communication end notifications of at least one of the plurality of participant devices;
    ending the multipoint communication when the total number of the remaining participant devices of the multipoint communication decreases to two due to multipoint communication end of at least one of the plurality of participant devices; and
    establishing a P2P connection with a remaining device of the remaining participant devices in the multipoint communication using the P2P connection information of the remaining device.

5. The method of claim 4, wherein the device is a first device and wherein the establishing the P2P connection comprises:
    calculating connection priorities of the first device and the remaining device; and transmitting a P2P connection request to the remaining device when the calculated connection priority of the first device is higher than the calculated connection priority of the remaining device.

6. The method of claim 5, wherein the connection priority of each of the first device and the remaining device is calculated based on at least one of whether corresponding one of the first and the remaining devices is a transmitter of the multipoint communication, a reception time of the multipoint communication of corresponding one of the first and the remaining devices, and identification information of corresponding one of the first and the remaining devices.

7. The method of claim 2, wherein the switching from the multipoint communication to the point-to-point communication comprises:
   receiving, from the multipoint communication server, multipoint communication end notifications of at least one of the plurality of participant devices;
   when the total number of the remaining participant devices of the multipoint communication decreases to two due to the multipoint communication end of the at least one of the plurality of participant devices, establishing a P2P connection with a remaining device of the remaining participant devices in the multipoint communication using the P2P connection information of the remaining device; and
   ending the multipoint communication.

8. The method of claim 7, wherein the device is a first device and the establishing the P2P connection comprises:
   calculating connection priorities of the first device and the remaining device; and
   transmitting a P2P connection request to the remaining device when the calculated connection priority of the first device is higher than the calculated connection priority of the remaining device.

9. The method of claim 8, wherein the connection priority of each of the first device and the remaining device is calculated based on at least one of whether corresponding one of the first and the remaining devices is a transmitter of the multipoint communication, a reception time of the multipoint communication of corresponding one of the first and the remaining devices, and identification information of corresponding one of the first and the remaining devices.

10. The method of claim 2, wherein the switching from the multipoint communication to the point-to-point communication comprises:
   receiving a P2P connection request from one of the plurality of participant devices; and
   ending the multipoint communication according to the P2P connection request to establish a P2P connection with the one of the plurality of participant devices transmitting the P2P connection request.

11. A non-transitory computer-readable recording medium having embodied thereon a program which, when executed, causes a device to implement a method, the method comprising:
   performing, by the device, the multipoint communication by connecting with a multipoint communication server and sending a request to the plurality of participant devices, the request instructing the plurality of participant devices to connect with the multipoint communication server;
   sharing, by the device, P2P connection information of the device and P2P connection information of each of a plurality of participant devices with the plurality of participant devices in order to switch from multipoint communication to point-to-point communication while the device performs the multipoint communication with the plurality of participant devices; and
   switching by the device, from the multipoint communication to the point-to-point communication using the P2P connection information of remaining participant devices of the plurality of participant devices in the multipoint communication when a total number remaining participant devices of the multipoint communication decreases to two.

12. The non-transitory computer-readable recording medium of claim 11, wherein the sharing comprises:
   registering, by the device, the P2P connection information of the device in the multipoint communication server; and
   receiving, by the device, the P2P connection information of the plurality of participant devices from the multipoint communication server.

13. The non-transitory computer-readable recording medium of claim 12, wherein the P2P connection information of the device comprises NAT type information of the device, a public network address of the device, a private network address of the device, and an address of a relay server in which the device is registered.

14. The non-transitory computer-readable recording medium of claim 12, wherein the switching from the multipoint communication to the point-to-point communication comprises:
   receiving, from the multipoint communication server, multipoint communication end notifications of at least one the plurality of participant devices;
   ending the multipoint communication when the total number of the remaining participant devices of the multipoint communication decreases to two due to multipoint communication end of at least one of the plurality of participant devices; and
   establishing a P2P connection with remaining device of the remaining participant devices in the multipoint communication using the P2P connection information of the remaining device.

15. The non-transitory computer-readable recording medium of claim 14, wherein the establishing the P2P connection comprises:
   calculating connection priorities of the first device and the remaining device; and
   transmitting a P2P connection request to the remaining device when the calculated connection priority of the first device is higher than the calculated connection priority of the remaining device.

16. The non-transitory computer-readable recording medium of claim 15, wherein the connection priority of each of the first device and the remaining device is calculated based on at least one of whether corresponding one of the first and the remaining devices is a transmitter of the multipoint communication, a reception time of the multipoint communication of corresponding one of the first and the remaining devices, and identification information of corresponding one of the first and the remaining devices.

17. The non-transitory computer-readable recording medium of claim 12, wherein the switching from the multipoint communication to the point-to-point communication comprises:
   receiving, from the multipoint communication server, multipoint communication end notifications of at least one of the plurality of participant devices;
   when the total number of the remaining participant devices of the multipoint communication decreases to two due to the multipoint communication end of the at least one of the plurality of participant devices, establishing a P2P connection with a remaining device of the remaining participant devices in the multipoint communication using the P2P connection information of the remaining device; and ending the multipoint communication.

18. The non-transitory computer-readable recording medium of claim 17, wherein the establishing of the P2P connection comprises:

calculating connection priorities of the first device and the remaining device; and transmitting a P2P connection request to the remaining device when the calculated connection priority of the first device is higher than the calculated connection priority of the remaining device.

19. The non-transitory computer-readable recording medium of claim 18, wherein the connection priority of each of the first device and the remaining device is calculated based on at least one of whether corresponding one of the first and the remaining devices is a transmitter of the multipoint communication, a reception time of the multipoint communication of corresponding one of the first and the remaining devices, and identification information of corresponding one of the first and the remaining devices.

20. The non-transitory computer-readable recording medium of claim 12, wherein the performing of the switching from the multipoint communication to the point-to-point communication comprises:

receiving a P2P connection request from one of the plurality of participant devices; and ending the multipoint communication according to the P2P connection request to establish a P2P connection with the one of the plurality of participant devices transmitting the P2P connection request.

* * * * *